United States Patent
Seidenfuss et al.

(10) Patent No.: US 12,036,708 B2
(45) Date of Patent: Jul. 16, 2024

(54) FILLING INJECTOR AND METHOD FOR OPERATING A FILLING INJECTOR

(71) Applicant: Kurtz GmbH, Kreuzwertheim (DE)

(72) Inventors: Harald Seidenfuss, Külsheim (DE); Manuel Danz, Wertheim (DE); Stefan Frosch, Würzburg (DE); Constantin Kemmer, Marktheidenfeld (DE); Victor Romanov, Wertheim (DE)

(73) Assignee: Kurtz GmbH, Kreuzwertheim (DE)

( * ) Notice: Subject to any disclaimer, the term of this patent is extended or adjusted under 35 U.S.C. 154(b) by 582 days.

(21) Appl. No.: 16/321,848

(22) PCT Filed: Jul. 31, 2017

(86) PCT No.: PCT/EP2017/069325
§ 371 (c)(1),
(2) Date: Jan. 30, 2019

(87) PCT Pub. No.: WO2018/024676
PCT Pub. Date: Feb. 8, 2018

(65) Prior Publication Data
US 2019/0168428 A1 Jun. 6, 2019

(30) Foreign Application Priority Data
Aug. 1, 2016 (DE) ..................... 20 2016 104 222.4

(51) Int. Cl.
*B29C 44/60* (2006.01)
*B29C 31/04* (2006.01)
(Continued)

(52) U.S. Cl.
CPC ............ *B29C 44/60* (2013.01); *B29C 31/041* (2013.01); *B29C 44/445* (2013.01); *B29C 45/03* (2013.01); *B29C 45/00* (2013.01)

(58) Field of Classification Search
CPC ....... B29C 44/60; B29C 45/445; B29C 45/60; B29C 45/00
See application file for complete search history.

(56) References Cited

U.S. PATENT DOCUMENTS 10,850,896 B2 * 12/2020 Schwabl ............. F16K 37/0041
2001/0024196 A1 * 9/2001 Nishizawa .......... G06F 3/04847
345/173
(Continued)

FOREIGN PATENT DOCUMENTS

DE 79 28 606 U1 1/1980
DE 38 31 600 C1 8/1989
(Continued)

OTHER PUBLICATIONS

International Search Report and Written Opinion, mailed on Nov. 8, 2017, from International Application No. PCT/EP2017/069325, filed on Jul. 31, 2017. 16 pages.
(Continued)

*Primary Examiner* — Alison L Hindenlang
*Assistant Examiner* — Debjani Roy
(74) *Attorney, Agent, or Firm* — HoustonHogle LLP

(57) ABSTRACT

The present invention relates to a filling injector and to a method for operating such a filling injector. The filling injector has a sensor for detecting a predetermined detection position of a closing piston unit and a counting device for counting the number of detection positions of the closing piston unit in which it is situated in the predetermined detection position. By means of this, when a predetermined number of detection positions is reached, a maintenance signal can be emitted and the maintenance interval can be adapted to the actual use of the filling injector.

25 Claims, 3 Drawing Sheets

(51) Int. Cl.
    *B29C 44/44*    (2006.01)
    *B29C 45/03*    (2006.01)
    *B29C 45/00*    (2006.01)

(56) References Cited

U.S. PATENT DOCUMENTS

| | | | |
|---|---|---|---|
| 2004/0247724 A1* | 12/2004 | Manner | B29C 45/17 425/149 |
| 2011/0316180 A1 | 12/2011 | Starkey | |
| 2014/0046465 A1* | 2/2014 | de Oliveira Antunes | B29C 45/80 700/97 |
| 2014/0300019 A1* | 10/2014 | Moss | B29C 45/2703 425/146 |
| 2016/0375701 A1* | 12/2016 | Osterday | B29C 44/58 156/245 |

FOREIGN PATENT DOCUMENTS

| | | |
|---|---|---|
| DE | 19637349 A1 | 4/1997 |
| DE | 197 47 645 A1 | 5/1999 |
| DE | 299 19 328 U1 | 2/2000 |
| DE | 10 2008 016 883 A1 | 7/2009 |
| DE | 102009024278 A1 | 12/2010 |
| DE | 102014117332 A1 | 6/2016 |
| EP | 0082913 A2 | 7/1983 |
| EP | 0224103 A2 | 6/1987 |
| JP | S5898130 A | 6/1983 |
| JP | H07266089 A | 10/1995 |
| WO | WO 2013/182555 A1 | 12/2013 |
| WO | WO 2015/091906 A1 | 6/2015 |

OTHER PUBLICATIONS

German Search Report created on Feb. 8, 2017 from German Application No. 20 2016 104 222.4, filed on Aug. 1, 2016. 16 pages.
International Preliminary Report on Patentability, mailed on Feb. 14, 2019, from International Application No. PCT/EP2017/069325, filed on Jul. 31, 2017. 17 pages.

* cited by examiner

FILLING INJECTOR AND METHOD FOR OPERATING A FILLING INJECTOR

RELATED APPLICATIONS

This application is a § 371 National Phase Application of International Application No. PCT/EP2017/069325, filed on Jul. 31, 2017, now International Publication No. WO 2018/024676, published on Feb. 8, 2018, which International Application claims priority to German Application 20 2016 104 222.4, filed on Aug. 1, 2016, both of which are incorporated herein by reference in their entirety.

The present invention relates to a filling injector for a plastics machine and a method for operating such a filling injector.

Plastics machines can, for example, be injection molding machines, but can also be machines for producing plastics from granulated foam.

DE 38 31 600 C1 has disclosed a method and a device for dispensing thermoplastic foam granules into the mold cavity of a mold; the primary goal is to be able to dispense thermoplastic foam granules, namely propellant-containing foam granules, as needed from a storage receptacle both at atmospheric pressure and at a positive pressure into an evacuated mold as well as to dispense non-expandable, compressible foam granules at positive pressure into a mold that is at an equally high pressure and in so doing, to save compressed air and reduce the filling time. This is achieved in that the foam granules remaining in the filling injectors and in the supply lines after the end of the filling procedure are blown back into an additional receptacle that is unpressurized and independent of the storage receptacle. The foam granules are dispensed into the mold cavity by a filling injector, whose closing piston can selectively open or close the supply opening of the mold cavity. Via a 2/2-port directional-control valve, compressed air from a compressed air source is pushed through injector nozzles mounted inside the filling injector, which causes foam granules to be sucked from the outlet opening of a storage receptacle via supply lines, a distributor housing, and a closing mechanism and pushed through the supply opening into the mold cavity when the closing piston is retracted. This is acted on with compressed air via a 3/2-port directional-control valve.

DE 197 47 645 A1 has also disclosed a method for producing a foam body and has disclosed the foam body; here, too, granulated foams are processed and the mold cavity is filled with foam granules of a predetermined granulation. The filling takes place by means of one or more fillers that are embodied as injectors and that are acted on with compressed air. The foam granules are sucked from a storage receptacle, not shown, and are blown into the mold cavity by means of the compressed air. In order to obtain a good filling, the mold cavity is evacuated during this procedure.

The use of filling injectors is also known from DE 10 2008 016 883 A1.

DE 299 19 328 U1 relates to a filling injector for rigid foam molding machines and DE 79 28 606 U1 also relates to a filling injector, in particular for feeding pre-foamed, still expandable, small-granule styrene polymers. In these two filling injectors, a piston rod has a smaller diameter than the piston.

WO 2013/182555 A1 relates to a method for transporting foamed thermoplastic polymer particles from a receptacle through at least one tube; to transport the foamed thermoplastic polymer particles, a gas flow is fed through the tube and the foamed thermoplastic polymer particles are wetted with a water-containing lubricant. The lubricant must contain water. The necessary pressure is produced by means of air or nitrogen.

DE 10 2009 024 278 A1 discloses a filling device for filling a mold with plastic granules made of thermoplastic plastic. In this case, an actuating piston is provided, which is connected to a closing piston and can move the latter. The actuating piston here has a contoured casing wall in which longitudinally extending air ducts are provided. In an open position, the closing piston is slid into an air duct. The closing piston is dimensioned so that between the closing piston and the air duct, an annular duct is formed, which functions as an outlet nozzle. Air that flows into an opening is guided through this outlet nozzle.

WO 2015/091906 A1 has disclosed a filling injector for filling a mold with plastic granules. The injector has a front part and a base part, which are positioned axially one after the other. The front part has an injector opening and an injector head, which are connected to each other via an internal tube; a casing tube is positioned around the internal tube. The base part has an intrinsically known pneumatic drive element, which is embodied with a square cross-section and has two compressed air connections. When the compressed air connections are actuated, an actuating piston is moved forward or backward in the drive element. A piston rod is coupled to the actuating piston. The drive element is thus embodied as a piston/cylinder unit, with a closing piston being positioned at the end of the piston rod oriented away from the actuating piston. At the opposite end, the pneumatic drive device is placed against a guide device. The guide device has a guide housing with a guide housing front part and a guide housing back part.

Injectors of this kind for filling a mold with plastic granules are often embodied in a modular fashion so that different front parts can be combined with different back parts.

In addition, filling injectors of this kind are highly stressed components, which, along with regular maintenance work, also require a corresponding replacement of expendable parts.

In filling injectors, the orifice and the tubing component of the bottom part of the injector head remain mounted on or in the mold permanently. The injector head top part, cylinder piston, closing piston, and all of the moving expendable parts (e.g. bearings) are replaced regularly.

The injector head bottom part and the injector head top part are usually provided with a quick release coupling, which is secured with a clamp; in other words, they are connected in a detachable way.

A separate filler is supplied with each supplied mold. The replaceable parts, however, are often swapped out during operation. For this reason, during production, confusion often arises as to which individual parts of the respective injectors have actually been used. In order to counteract this, in some production plants, the expendable parts are replaced every week, regardless of whether or not a replacement is needed.

Devices for manufacturing granulated foam parts are disclosed by DE 10 2014 117 332 A1, DE 19637349 A1, EP 082 913 1, and EP 224 103 B1.

The object of the invention is to create a filling injector with which the maintenance can be standardized, the maintenance costs can be reduced, and the maintenance can be made more reproducible.

The object is attained with a filling injector for a mold having the features of claim 1.

Advantageous modifications are disclosed in the dependent claims.

The invention therefore relates to a filling injector for a mold having an injector housing, which has a cylindrical cavity in which a closing piston unit is supported in movable fashion; the injector housing has a supply for plastic granules leading to the cavity and at an end oriented toward the mold, has a mold opening for supplying the plastic material to a mold; in a closed position, the closing piston unit is slid so far forward that it closes the mold opening and in an open position, it is retracted from the cylindrical cavity at least in the region between the supply and the mold opening; and inside the injector housing, a sensor is provided for detecting a predetermined detection position of the closing piston unit and a counting device for counting the number of detection positions of the closing piston unit in which it is placed.

The invention also relates to a filling injector in which the injector housing is composed of an injector tube and an injector cap that closes the injector tube at the end remote from the mold opening. The injector cap can advantageously be embodied separately from the injector tube or also be embodied as integrally connected to the injector tube.

In another advantageous embodiment, the injector tube is composed of a front injector tube section, which has the mold opening, and a rear injector tube section and these sections are detachably coupled to each other.

In another advantageous embodiment, between the front injector tube section and the rear injector tube section a front injector head and a rear injector head can be provided, between which the detachable connection is produced.

The invention also relates to a filling injector in which the front or rear injector head has one air connection and the injector cap has another air connection, and the closing piston unit has an actuating piston positioned in the rear tube section in order to move the closing piston unit forward or backward by means of a corresponding supply of compressed air through one of the two air connections.

It is also advantageous if the closing piston unit is coupled in captive fashion to the rear injector section. This means that when the rear injector tube section is detached, the closing piston unit is suspended on it, even though it is loose.

The rear injector head, the rear injector tube section, and the injector cap in this case comprise a structural whole, which can be easily replaced as a unit. In this case, it is advantageous that a subsequently produced identification number is practically always allocated to this unit.

It is also advantageous that the filling injector has a power supply for operating the sensor and the counting device.

The power supply can also advantageously be a battery and/or an electromagnetic induction unit that converts a part of the movement energy of the closing piston unit into electrical energy.

It is also advantageous if the filling injector has a data interface for transmitting a counter reading.

The data interface advantageously has a radio interface for contactless transmission of a counter reading or is embodied as such an interface.

In another advantageous embodiment, the filling injector has a display device for displaying one or more operating states, which correspond for example to a predetermined counter reading of the counting device or a predetermined state of a power supply.

It is advantageous if the predetermined position of the closing piston unit is the open position in which the closing piston unit is preferably maximally retracted.

It is also advantageous if the closing piston unit is provided with a magnet element and the sensor for detecting the predetermined position is a magnet sensor.

It is advantageous if the injector housing is provided with a contact sensor that detects the predetermined position of the closing piston unit by contacting the closing piston unit.

The counting device can advantageously be embodied to count multiple counter readings, with at least part of the counter readings being resettable.

The counting device can also be advantageously coupled to an identification device, which contains an identification code.

According to the invention, the maintenance of the filling injectors should be simplified so that a higher reliability of the machines is achieved. In addition, improper manipulations and also the use of counterfeit parts or other unsuitable replacement parts or the replacement of parts that have already worn too far should be prevented.

Consequently, the overall objective is a so-called "preventive maintenance," which means that in order to prevent excessive wear, parts are replaced at fixed intervals such as every week, which does incur high costs, but should prevent replacements from being made too late or incorrectly and thus on the one hand reducing quality and on the other, possibly resulting in failures at inopportune times. This approach improves predictability so that the maintenance can be scheduled at convenient times, e.g. during mold replacement or a production stop due to vacation or during weekend hours. Up to this point, it was not possible to know exactly when filling injectors required maintenance.

The steps according to the invention can also prevent counterfeit parts or pirated copies from being used, which can damage the entire machine when they fail, without providing any information about this to the machine manufacturer.

Consequently, as one measure of the invention, each expendable part of the filling injector is provided with an ID. Such an ID includes, for example, the production date, the model, and possibly other things in a coded form.

Since additional electrical lines leading to the filling injector are rejected on the market, a contact transmitter and contact receiver are provided in or on the filling injector. For example, the device can be a solenoid switch device or the like. In particular, it can be a magnet as the contact transmitter and an induction coil, Hall sensor, or reed contact as the contact receiver.

By means of these, the cycles are counted in a contactless and autonomous fashion. Alternatively, cycles can be counted with existing end contacts. But this entails a significant wiring cost; in this case, the measurement is carried out in a machine-specific way, but not in a filling injector-specific way. This is not preferable since when a filling injector is replaced, the cycles of another filling injector are also detected at the same time.

Preferably, a counting device is used, which functions autonomously, with the power supply being connected to the filling injector itself. Consequently, according to the invention, a battery can be used for this or for example the piston movement can be used to produce electrical energy by means of an induction coil. There are also other possibilities for energy harvesting in filling injectors.

According to the invention, a printed circuit board is provided, which is positioned on the filling injector so that it cannot be replaced or manipulated from the outside. This printed circuit board has an antenna, an RFID chip, and a microcontroller. With an RFID reader, data can be retrieved contactlessly, with the possibility, after maintenance or repair work by authorized repair personnel at the maintenance facility, of resetting the counter, in particular resetting it to zero. In this case, it is advantageous if it is not the overall counter reading that is set to zero, but rather only the number cycles since the last maintenance. By means of coding in the RFID connection between the chip and the reader, it is also possible to determine if unauthorized attempts have been made to access the printed circuit board or the data on the printed circuit board.

According to the invention, an optical display can be provided, which displays the status of the battery, the functionality of the electronics, and/or the maintenance status. In the simplest case, the optical display can, for example, be an LED display, which is on or off and/or flashes at certain intervals and/or lights up in different colors as a function of particular operating states.

Preferably, the device is positioned on the filling injector so that it cannot be nondestructively removed or opened. For example, the printed circuit board, the antenna, and other sensor parts such as magnet parts can be encapsulated in the corresponding component; the battery can also be encapsulated. Particularly if the battery has a service life that is longer than a maintenance interval for replacement of the corresponding part of the filling injector in which the battery is embedded.

In addition, however, the battery can also be accessible from the outside; in this case, a cover for the battery either cannot be nondestructively opened or a lead seal is provided, which is damaged during opening. It is therefore preferable if the printed circuit board is not a component of such a cover and always remains in the filling injector. Preferably, stored values are not lost during the battery change, but are instead written to a memory in such a way that they persist. In an advantageous embodiment, the cover has a frosted glass screen behind which at least one light-emitting diode or another lighting device is provided. When the light-emitting diode lights up, this illuminates the entire cover, which makes it easier for the machine operator to see this on the machine since the surface is larger.

If the device is positioned in the cylinder cap of the filling injector, then the cylinder cap includes the cylinder cap housing, the cover, the battery, and the printed circuit board; the printed circuit board includes all of the electronic components such as the reed contact, the RFID controller, the battery holder, LEDs, the coil serving as an antenna, and sealing rings. Depending on the power supply, i.e. on whether it is supplied by battery or by energy harvesting, the device is consequently designed so that it also has more or fewer LEDs or even no LEDs.

The cylinder cap in this case is the component on which the air connection of the cylinder for the closing movement is positioned. The air connection for actuating the cylinder in the opening direction is positioned on the upper part of the injector head. The basic function of the cylinder cap is to close the cylinder and to supply compressed air. With the invention, the cylinder cap is turned into another functional component.

With energy harvesting, an additional coil is preferably arranged around the cylinder; the magnet, which is positioned on the piston, is moved by means of the coil. By means of this, electrical energy can be produced, which can be used to operate the electronics. A short-term buffer, such as a capacitor, is advantageous in this case and is primarily important for LEDs since a one-time energy pulse is sufficient for the counting.

The invention also relates to a method for operating an above-explained filling injector; when a predetermined number of detection positions is reached, a maintenance signal is emitted.

Through the automatic counting and emission of the maintenance signal, the prophylactic replacement of parts of the filling injector that is usually performed in the prior art can be avoided if it is not needed. Through this counting of the detection positions, it is possible for maintenance intervals to be kept in accordance with the actual use of the filling injector.

The maintenance signal can be emitted as a light signal by means of a lighting device such as a light-emitting diode that is integrated into the filling injector and/or by means of a radio signal. The radio signal can be produced, for example, by means of an RFID chip.

Alternatively or in addition, other functional states of the filling injector can be emitted by means of a corresponding signal (light signal or radio signal), for example indicating the charge state of a battery and/or the functionality or operating state of electronics contained in the filling injector.

Preferably, an overall counter reading counts the number of detection positions that can be read by means of the data interface.

The method is preferably embodied so that the overall counter reading can never be reset. In addition, a cycle counter reading is provided with which a maintenance cycle can be monitored. This cycle counter reading can be reset to 0 each time maintenance is performed.

Preferably, a radio interface, in particular an RFID radio interface, is used as the data interface.

The invention will be explained by way of example based on the drawings.

In the drawings:

FIG. 1 schematically depicts a filling injector in a perspective, partially disassembled view;

Figure 1:
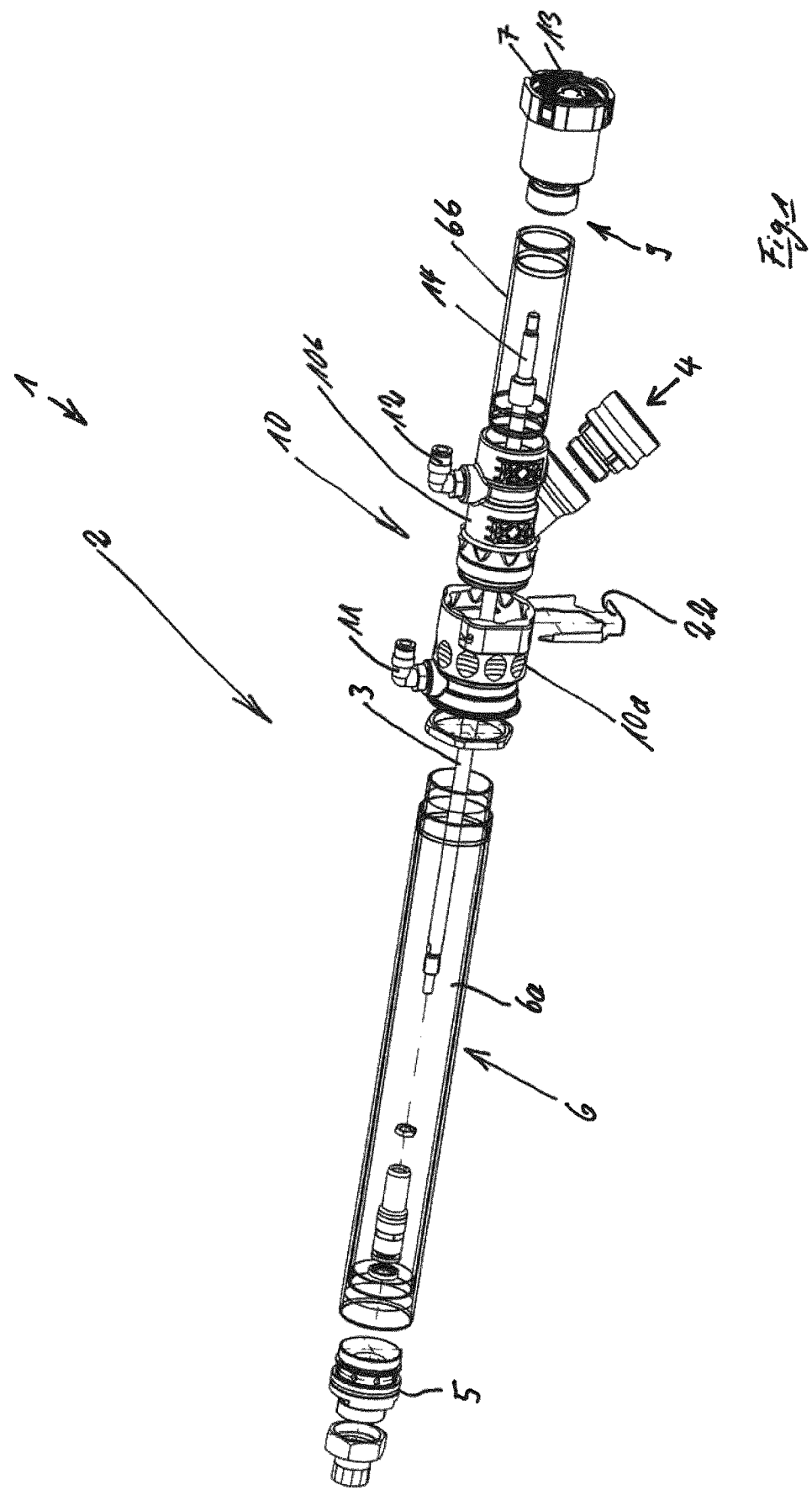

A filling injector 1 for a mold according to the invention has an injector housing 2, which has a cylindrical cavity 6 in which a closing piston unit 3 is positioned and supported in an axially movable fashion.

The injector housing 2 has a supply 4 for foam granules leading to the cavity 6.

At an end of the cylindrical cavity 6 oriented toward the mold, the filling injector 1 has a mold opening 5 for supplying the plastic material to a mold.

In an intrinsically known way, in a closed position, the closing piston unit 3 is slid so far forward that it closes the mold opening 5 and in an open position, is retracted from the cylindrical cavity 6 at least in the region between the supply 4 and the mold opening 5.

The injector housing 2 is composed of an injector tube 6 and an injector cap 7. The injector cap 7 closes the injector tube 6 at the end 9 remote from the mold opening 5 or the end 9 diametrically opposite from the mold opening 5 in the axial direction.

The injector tube 6 in this case is composed of a front injector tube section 6*a*, which has the mold opening 5, and a rear injector tube section 6*b*, which has the injector cap 7.

The tube section 6a in this case is particularly embodied as significantly longer axially than the rear injector tube section 6b.

Between the front injector tube section 6a and the rear injector tube section 6b, an injector head 10 is provided to connect the two tube sections 6a, 6b. The injector head 10 has a front injector head 10a and a rear injector head 10b; the front injector head 10a is embodied on the front injector tube section 6a and the rear injector head 10b is embodied on the rear injector tube section 6b.

The front injector head 10a and the rear injector head 10b can be detachably connected to each other, as a result of which, the front injector tube section 6a and the rear injector tube section 6b can also be detachably connected to each other.

The front injector head 10a and/or the rear injector head 10b each have an air connection 11, 12.

The injector cap 7 likewise has an air connection 13, which is embodied so that air can be conveyed through the injector cap 7 into the rear injector tube section 6b.

The closing piston unit 3 has an actuating piston 14 positioned in the rear injector tube section 6b, with the actuating piston 14 being positioned at an end that closes the mold opening 5.

Preferably, the closing piston unit 3, particularly by means of the actuating piston 14, is coupled to or positioned on the rear injector tube section 6b and/or the rear injector head 10b in captive fashion.

This means that when the rear injector tube section 6b is detached, the closing piston unit 3 remains coupled to it; the coupling can even be loose. It is essential that the closing piston unit, the rear injector tube section 6b, and the injector cap 7 form a structural whole and can be simply replaced as a unit. In particular, this assembly has one identification number, which is assigned to this unit in order to prevent arbitrary replacement of the individual elements.

On the injector housing 2 or in the injector housing 2, a sensor 8 is provided to detect a predetermined detection position of the closing piston unit 3 and a counting device is provided for counting the number of detection positions of the closing piston unit 3. It is thus possible to particularly determine what position the closing piston unit 3 is in or how often it has been situated in the detection position.

In principle, the detection position can be located at any point on the injector housing. For example, the detection position can be on the mold opening, on or in the tube section 6a, in the front injector head 10a, in the rear injector head 10b, in the rear injector tube section 6b, or on the injector cap 7. In this connection, it should be noted that with the measurement of end stops, i.e. with the measurement at the mold opening or at the injector cap, detection positions are detected that are reached only one time per working stroke.

At the other places, the detection position is then selected so that each stroke, i.e. both the forward stroke and the return stroke of the device, is counted. This must be noted.

The sensor 8 therefore can be positioned on or in the mold opening 5, on or in the tube section 6a, in the front injector head 10a, in the rear injector head 10b, in the rear injector tube section 6b, or on or in the injector cap 7.

The filling injector can have a power supply 15 for the operation of the sensor 8 and/or a provided counter device. This insures that the filling injector is autonomous relative to the sensor and the counting procedure.

In this case, the power supply can be a battery 15 and/or an electromagnetic induction unit.

If an electromagnetic induction unit is used, this can convert a part of the movement energy of the closing piston unit 3 into electrical energy, e.g. by means of an inductor.

Preferably, storage elements are provided for storing the energy that is produced, for example, by induction; in particular, a capacitor can be used in a known way for this.

Figure 2:
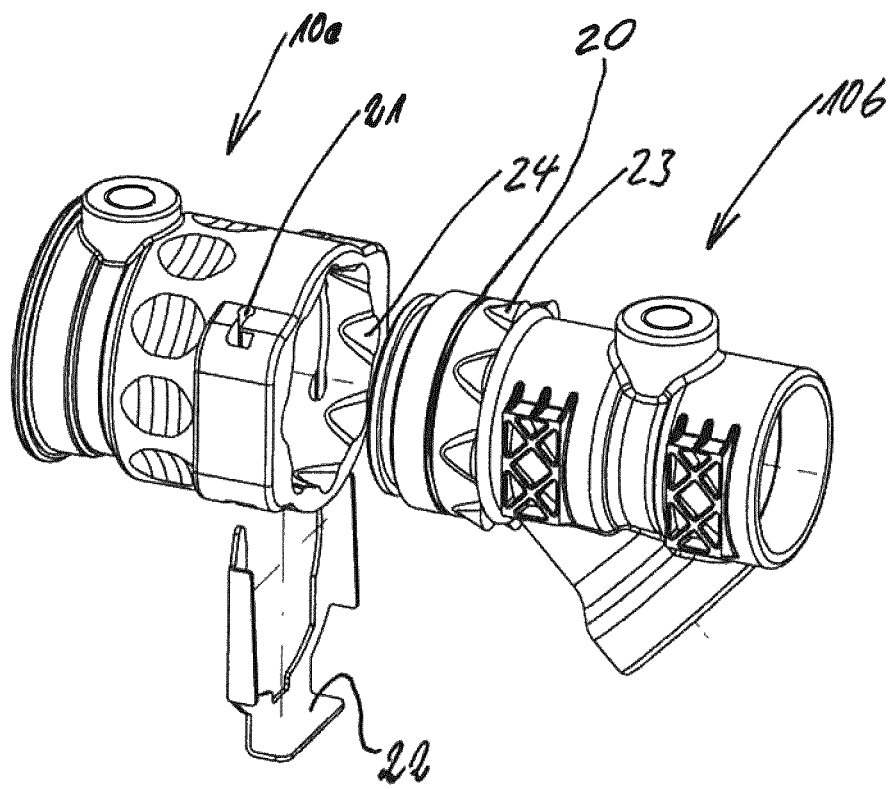
FIG. 2 shows a detail according to FIG. 1, showing an injector head.
Figure 3:
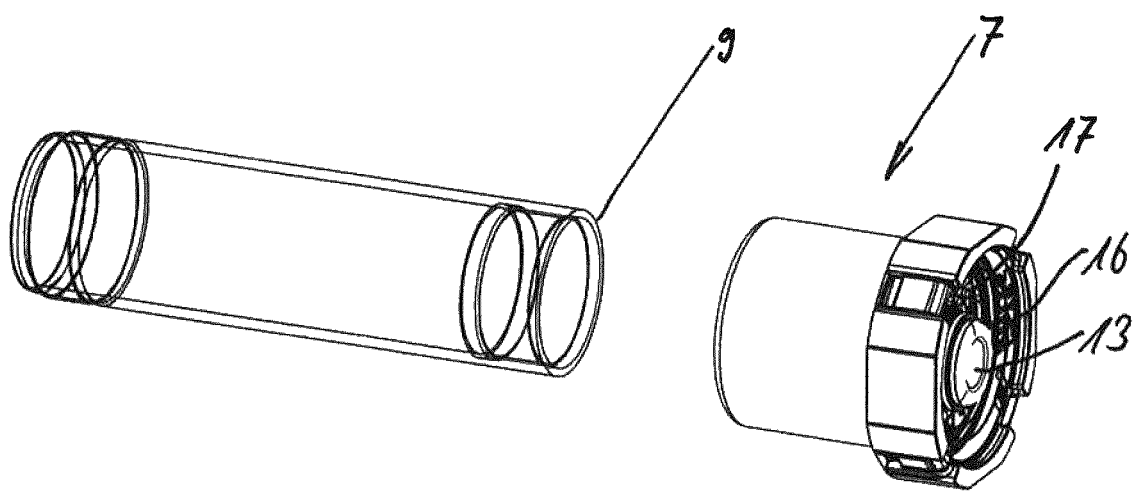
FIG. 3 is a perspective view of an injector cap and the adjoining tube.

In an advantageous embodiment of the invention (FIG. 2), the front injector head 10a and the rear injector head 10b are tube sections that can be axially inserted into each other; a circumferentially extending radial locking groove 20 is provided on one of the injector heads.

On the respective other injector head 10a, 10b, a corresponding groove 21 is provided, which, in the fully slid-together or inserted state of the injector heads 10a, 10b, is flush with the groove 20. A locking clamp 22 can be inserted into the groove 21 and extends through both the grooves 21 and the groove 20 and thus ensures an axial locking of the injector heads 10a, 10b relative to each other.

Preferably, at least one centering wedge 23 is provided on the injector head that is inserted into the respective other injector head (the injector head that has the smaller diameter in the insertion region), which centering wedge is embodied so that it is able to engage in a corresponding centering groove 24 on the respective other injector head so that the two injector heads 10a, 10b are affixed relative to each other.

In addition, the tube connection between the two injector heads 10a, 10b naturally has seals, which are in particular embodied as O-ring seals or as Dilag seals and guides.

Figure 4:
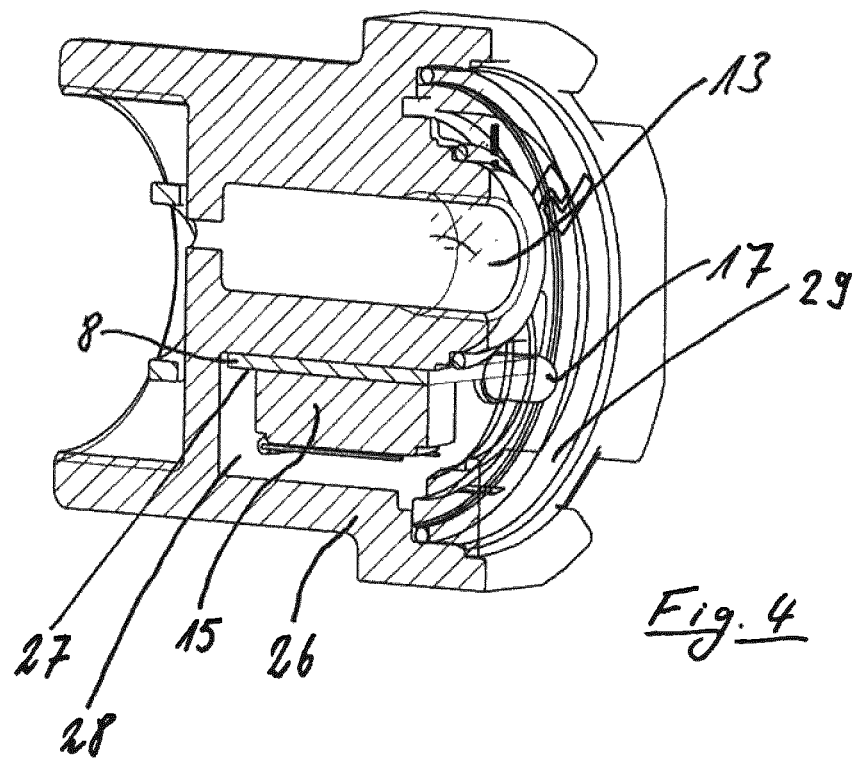
FIG. 4 is a partial cut-away perspective view of the cylinder cap according to FIG. 3.
Figure 5:
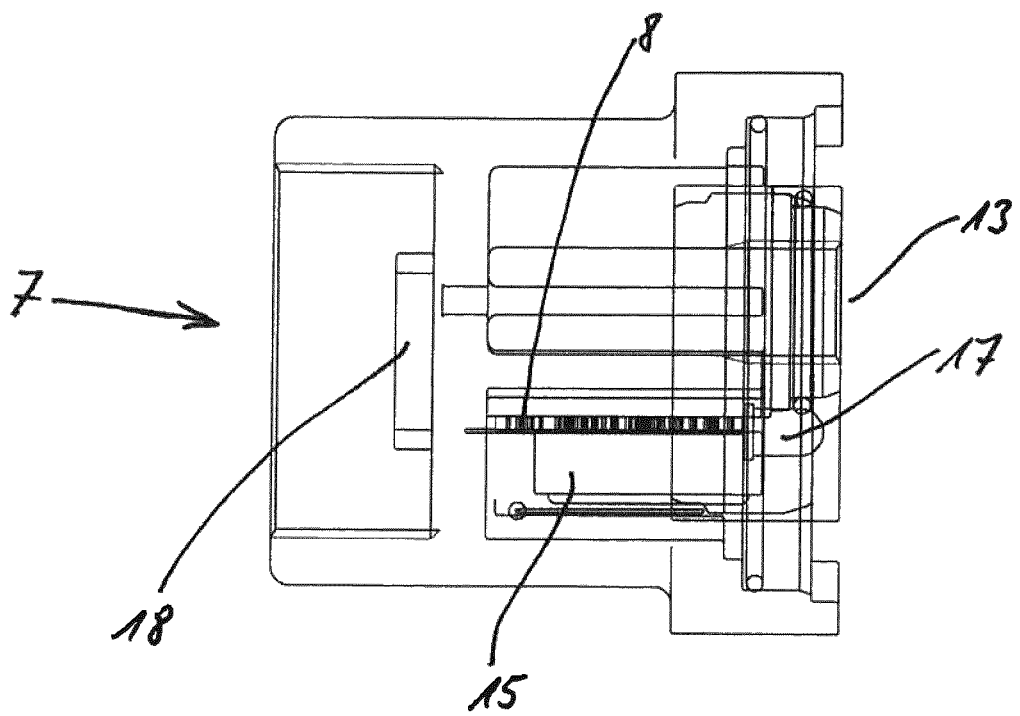
FIG. 5 shows a sectional view of the cylinder cap according to FIG. 4 with a magnet ring to be positioned on the piston.

In an advantageous embodiment, the sensor and counting device are embodied on the injector cap 7 (FIGS. 4 & 5).

To this end, the injector cap 7 is embodied as essentially cylindrical and has a cylindrical compressed air connection 13 coming from an outside 25; the cylindrical compressed air connection 13 does not have to be embodied as coaxial.

A printed circuit board 27 is positioned between the compressed air connection 13 and a radial outer wall 26.

In particular, an RFID chip and a microcontroller are positioned on the printed circuit board. In addition, the printed circuit board can be provided with a reed contact or Hall sensor that interacts with the magnet ring or other suitable contact transmitters, in order to detect the position and/or the number of positions of the closing piston unit 3.

Preferably, the power supply, particularly the power supply in the form of a battery 15, is provided adjacent to the printed circuit board 27.

The display 17 is also provided in this region; the display 17 can particularly be embodied in the form of an LED or a plurality of LEDs, which flashes and in particular, flashes with a predetermined color in order to indicate a particular state of the battery and/or the maintenance or another desired parameter.

An interface for transmitting the counter reading and in particular a coil or antenna 16 can be arranged around the compressed air connection 13; the antenna 16, the tray 28 for the battery, and the space for the printed circuit board 27 and LEDs 17 are covered by a cover 29.

In order to make the interior visible, the cover 29 can in particular be embodied as transparent or as partially opaque.

The cover 29 is positioned on the injector cap 7 particularly so that it can be removed only by causing damage or by damaging a lead seal or the like so that manipulations of the interior are visible and in particular, only maintenance personnel can legitimately replace a damaged cover or a damaged lead seal.

In order to rule out the possibility of manipulations of the printed circuit board 27, the printed circuit board 27 can be embodied of one piece with the injector cap 7 and in particular, can be encapsulated in or cast into the injector cap 7.

If an energy storage device in the form of a battery is eliminated and the energy is provided by means of energy harvesting, then the energy production for example by means of induction can advantageously be used directly for the counting so that an induction coil that detects the movement of the closing piston 3 is simultaneously the sensor 8.

REFERENCE NUMERALS 1 filling injector
2 injector housing
3 closing piston unit
4 supply
5 mold opening
6 cavity
7 injector cap
8 sensor
9 end
10*a* injector head
10*b* injector head
11 air connection
12 air connection
13 compressed air connection
14 actuating piston
15 power supply
16 data interface
17 display
18 magnet element
20 locking groove
21 groove
22 locking clamp
23 centering wedge
24 centering groove
25 outside
26 outer wall
27 printed circuit board
28 tray
29 cover
30 drive element

The invention claimed is:

1. A filling injector for a mold having an injector housing, which has a cylindrical cavity in which a closing piston unit is supported in movable fashion;
the injector housing has a supply for plastic granules leading to the cavity and at an end oriented toward the mold, has a mold opening for supplying the plastic material to a mold and
in a closed position, the closing piston unit is slid so far forward that it closes the mold opening and in an open position, is retracted from the cylindrical cavity at least in the region between the supply and the mold opening, wherein
in or on the injector housing: 1) a sensor is provided for detecting a predetermined detection position of the closing piston unit and 2) a counting device is provided for counting the number of detection positions of the closing piston unit in which it is situated in the predetermined detection position;
wherein the counting device functions autonomously and is provided in or on the injector housing.

2. The filling injector according to claim 1, wherein
the injector housing is composed of an injector tube and an injector cap that closes the injector tube at the end remote from the mold opening.

3. The filling injector according to claim 1, wherein
the filling injector has a power supply for operating the sensor and the counting device.

4. The filling injector according to claim 1, wherein
the filling injector has a data interface for transmitting a counter reading.

5. The filling injector according to claim 1, wherein
the filling injector has a display device in or on the injector housing for displaying one or more operating states, which correspond for example to a predetermined counter reading of the counting device or a predetermined state of a power supply.

6. The filling injector according to claim 1, wherein
the predetermined position of the closing piston unit is the open position in which the closing piston unit is preferably maximally retracted.

7. The filling injector according to claim 1, wherein
the closing piston unit is provided with a magnet element and the sensor for detecting the predetermined position is a magnet sensor.

8. The filling injector according to claim 1, wherein
the injector housing is provided with a contact sensor that detects the predetermined position of the closing piston unit by contacting the closing piston unit.

9. The filling injector according to claim 1, wherein
the counting device is embodied to count multiple counter readings, with at least part of the counter readings being resettable.

10. The filling injector according to claim 1, wherein
the counting device is coupled to an identification device, which contains an identification code.

11. The filling injector according to claim 1, wherein
the filling injector is a filling injector for a mold for producing granulated foam parts; the supply is embodied to supply foam granules and the mold opening is embodied to supply the foam granules to a mold.

12. The filling injector according to claim 1, wherein the sensor generates a maintenance signal when a predetermined number of detection positions is reached.

13. The filling injector according to claim 1, wherein the sensor generates a maintenance signal when that indicates a charge state of a battery for powering the sensor.

14. The filling injector according to claim 1, wherein the injector housing comprises an injector tube and an injector cap that closes the injector tube at the end remote from the mold opening, wherein the counting device is located in the injector cap.

15. The filling injector according to claim 2, wherein
the injector tube is composed of a front injector tube section, which has the mold opening, and a rear injector tube section and these sections are detachably coupled to each other.

16. The filling injector according to claim 15, wherein between the front injector tube section and the rear injector tube section, an injector head is provided; a front injector head and a rear injector head are provided, between which the detachable connection is formed.

17. The filling injector according to claim 16, wherein the front injector head or the rear injector head has an air connection and the injector cap has another air connection, and the closing piston unit has an actuating piston that is provided in the tube section in order to move the closing piston unit forward or backward by means of a corresponding supply of compressed air through one of the two air connections.

18. The filling injector according to claim 15, wherein the closing piston unit is coupled in captive fashion to the rear injector tube section.

19. The filling injector according to claim 3, wherein the power supply has a battery and/or an electromagnetic induction unit that converts a part of the movement energy of the closing piston unit into electrical energy.

20. The filling injector according to claim 4, wherein the data interface is a radio interface embodied for contactless transmission of a counter reading of the counting device.

21. The filling injector according to claim 12, wherein the sensor includes a light-emitting diode that is integrated into the filling injector for generating the maintenance signal.

22. The filling injector according to claim 12, wherein the sensor includes radio interface is used as the data interface for generating the maintenance signal.

23. The filling injector according to claim 14, wherein the counting device is implemented in a printed circuit board installed in the injector cap.

24. The filling injector according to claim 23, wherein the sensor is implemented in the printed circuit board.

25. The filling injector according to claim 24, further comprising a battery in the cap for powering the printed circuit board.

\* \* \* \* \*